Sept. 5, 1950            J. H. STROOP            2,520,976
VALVE FOR CONTAINERS AND THE LIKE
Filed Jan. 29, 1944            2 Sheets—Sheet 1
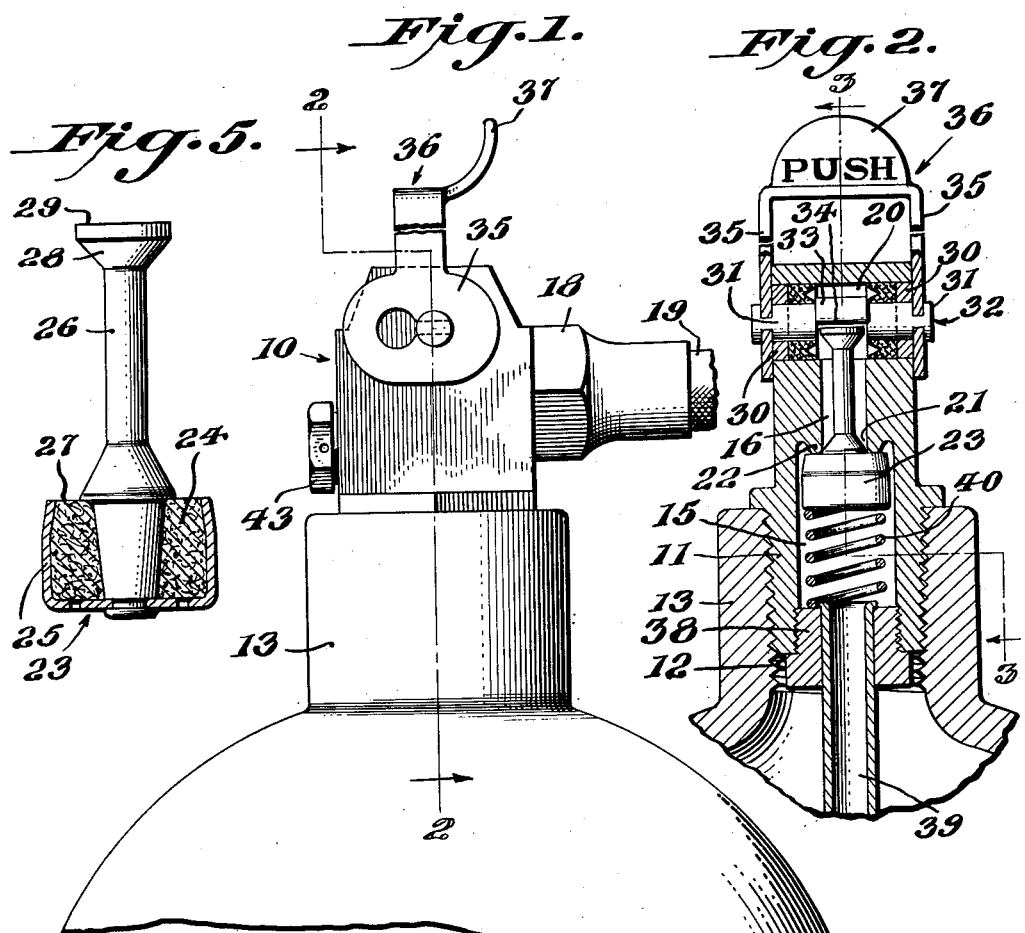
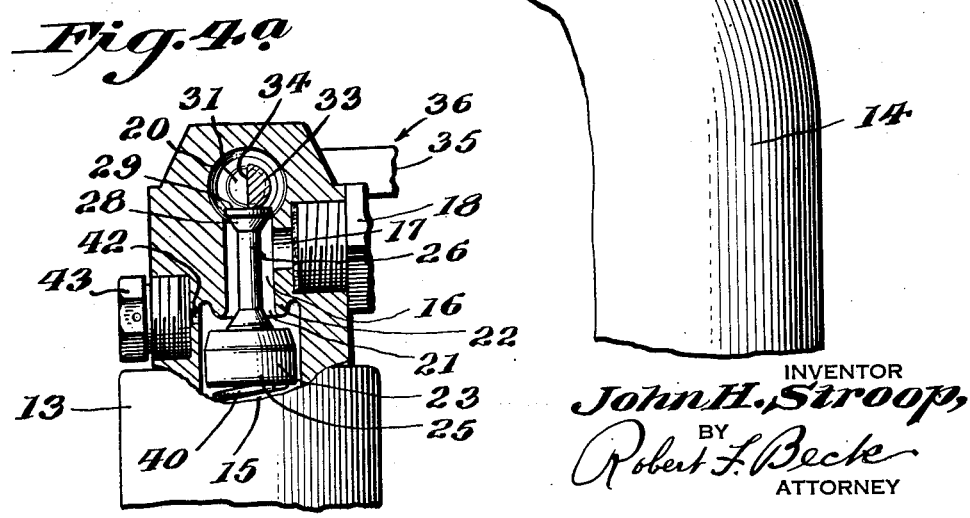
INVENTOR
John H. Stroop,
BY
Robert F. Beck
ATTORNEY Sept. 5, 1950    J. H. STROOP    2,520,976
VALVE FOR CONTAINERS AND THE LIKE
Filed Jan. 29, 1944    2 Sheets-Sheet 2
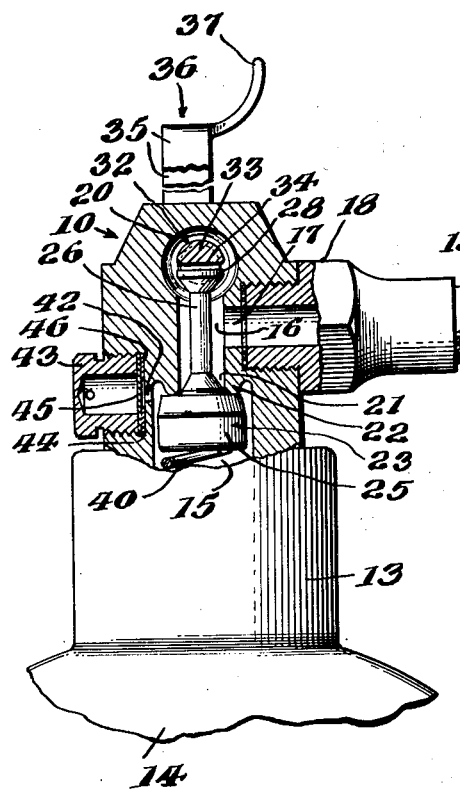
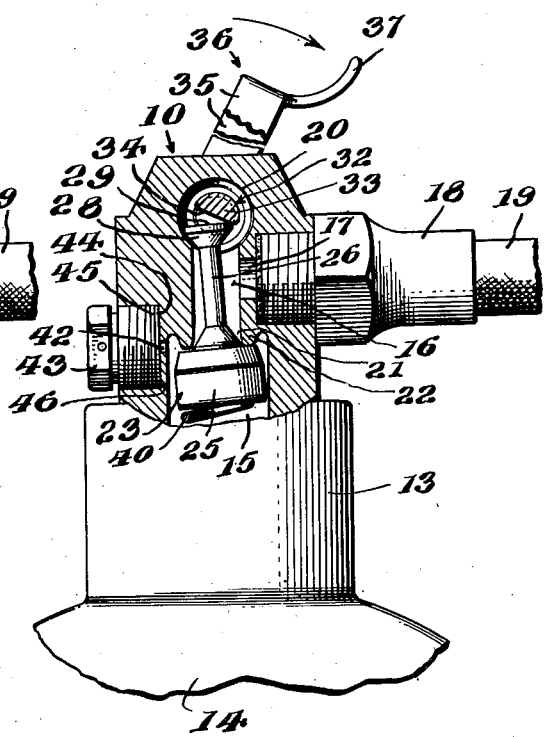
INVENTOR
John H. Stroop,
BY
Robert F. Beck
ATTORNEY

UNITED STATES PATENT OFFICE 2,520,976

VALVE FOR CONTAINERS AND THE LIKE

John H. Stroop, New York, N. Y., assignor to Specialties Development Corporation, Bloomfield, N. J., a corporation of New Jersey Application January 29, 1944, Serial No. 520,230

6 Claims. (Cl. 251—132)

My invention relates to means for releasing fluid pressure medium from a container or the like, and more particularly to a control head or valve.

One of the principal objects of my invention is to provide a valve operable for releasing fluid medium under pressure from a container or the like, which is so constructed and arranged as to require a relatively small operating force for effecting release of the fluid medium.

Another object of my invention is to provide a valve of the foregoing described character wherein initial unseating of a valve member is facilitated and the valve member is adapted to be retained in fully unseated position with a minimum effort.

A further object of my invention is to provide a valve of the foregoing described character which is simple in construction, durable in use, efficient in operation and economical in manufacture.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Figure 1 is a side elevation view of a valve illustrating my invention, as applied to a fluid medium container.

Figure 2 is a sectional view taken on the line 2—2 of Figure 1.

Figures 3 and 4 are sectional views taken on the line 3—3 of Figure 2, illustrating the valve member in seated and initially unseated positions, respectively.

Figure 4a is a fragmentary sectional view, illustrating the valve member retained in unseated position.

Figure 5 is an enlarged sectional view of the valve member.

Figure 6 is an enlarged perspective view of a cam for operating the valve member.

In practising my invention, as illustrated in the drawings, I provide a valve body or a casing 10 formed with an exteriorly threaded shank 11 (Figure 2) extending therefrom and secured within a threaded opening 12 formed in the neck 13 of an elongated cylindrical container 14, adapted for the storage of high pressure fluid medium, for instance, carbon dioxide. The casing 10 is provided with inlet and outlet passages 15 and 16, respectively, and with the inlet passage 15 extending axially through the shank. A bore 17 effects communication between the outlet passage 16 and a fitting 18 threadedly secured to the casing, the fitting 18 being connected to a conduit 19 or the like for conveying the medium from the outlet passage 16 to a desired discharging locality. The end of the outlet passage 16, remote from the inlet passage, communicates with a transversely extending cam chamber 20, the latter being right angularly disposed with respect to the bore 17.

Communication between the inlet and outlet passages is effected by an annular valve seat formed integrally with the body and provided with an opening 21 for effecting communication between the passages 15 and 16 and which opening 21 is defined by a circular rib 22 extending into the inlet passage and spaced from the circumferential wall thereof.

A valve member 23 (Figure 5) is disposed within the inlet passage 15 for cooperation with the valve seat having a body comprising a ring 24 constructed of suitable sealing material which is encased by a metallic cup-shaped retainer 25. A valve stem 26 is disposed within the ring and is attached to the radial wall of the retainer 25, the open end of the retainer permitting the adjacent annular face 27 of the ring to be exposed and engage the rib 22 and seat thereon. In proximity to the ring, the stem 26 has a frusto-conical configuration with the base being disposed adjacent the ring and having a diameter smaller than the diameter of the opening 21 in the valve seat whereby it coacts with the wall defining the opening 21 to effect centralization of the valve member with respect to the valve seat. The stem extends through the opening 21 and passage 16 and terminates in a frusto-conical head 28 disposed in the cam chamber 19, the head being provided with a substantially flat end face 29. The head diameter and angle of the frusto-conical head 28 is such that the head 28 may be radially displaced within the cam chamber 20 to effect initial tilting of the valve member 23 as will be hereinafter explained, but, upon further opening of the valve, will serve to realign the upper end of the valve stem 26 in the outlet passage 16 as the lower portion of the frusto-conical head 28 moves into the upper end of the outlet passage 16.

The ends of the cam chamber 20 are closed by plugs constituting bearings 30 in which trunnions 31 of a cam 32 (Figure 6) are rotatably mounted. The trunnions are connected together, in spaced relation, by an elongated plano-cylindrical section 33, the flat or plane surface of the section constituting a cam face 34 for engaging the face 29 of the head 28 of the valve stem. The section 33, as illustrated in the drawings (Figures 2 and 3), extends across the head 28 and with the cam face 34 adjacent the head and in spaced relation therewith when the valve member is seated on the valve seat. The outer ends of the trunnions 31 are provided with slots for attachment to the ends of the arms 35 of an operating yoke 36, the cross-bar of the yoke being formed with a finger-piece 37.

The lower end of the inlet passage 15, has a plug 38 threadedly attached thereto for securing the end of a syphon tube 39 which extends into the container and is adapted to convey the medium therefrom into the inlet passage. A spring 40 is mounted in the inlet passage 15 and has one end engaging the valve member 23 and has its other end seated on the plug 38. The spring serves to normally maintain the valve member 23 in seating engagement with the valve seat rib 22, thus precluding passage of fluid medium from the container into the outlet passage 16. When the fluid medium is stored in the container under relatively high pressure, the spring 40 may be eliminated, the pressure of the medium serving to maintain the valve member in seated relation with the rib until the valve member is initially unseated, as hereinafter set forth.

The casing 10 is provided with a bore 42 (Figures 3 and 4) which extends transversely through the casing and communicates with the inlet passage 15. The bore 42 is formed with a counterbore which has threaded therein an apertured anti-recoil plug 43 for holding a washer 44 and a safety sealing disc 45 on the seat 46 of the counterbore. The disc 45 is subjected to the pressure of the medium in the container and is adapted to be ruptured when the pressure becomes dangerously high, whereby the medium may be vented to the atmosphere by way of the plug 43.

In order to effect initial unseating of the valve member 23 relative to the valve seat, to permit discharge of the medium from the container, the finger-piece 37 is depressed or pushed by the operator in the direction indicated by the arrow in Figure 4 thereby effecting rotation of the cam 32 by means of the yoke 36. When the cam is thus rotated, the cam face 34 engages the face 29 of the head 28 of the valve stem and effects tilting or downward displacement of the valve stem relative to the passage 16 with resultant pivoting of the valve ring 24 with relation to the seat thus breaking the seal therebetween. During the pivoting or tilting of the valve member, there is established a shiftable pivot point between the valve member and the rib 22 and on which the valve member is seated. When the seal is thus broken, the pressure of the fluid medium tends to urge the valve member away from the seat, it being understood that after initial displacement of the valve member, by the cam face, the path of travel of the valve member is in the plane substantially right angular with the axis of the rotation of the cam.

Upon further rotation of the cam 32, the edge of the cam face 34 merging with the cylindrical portion of the section 33 engages the end face 29 of the valve stem 26 to urge the valve member more fully from its seat. As the valve stem 26 is depressed to unseat the valve further, the portion of the frusto-conical head 28 of the valve stem within cam chamber 20 will engage the edge formed by the intersection of the outlet passage 16 and the cam chamber 20 and be centered in the passage as the periphery of the frusto-conical portion of the head 28 engaging this edge increases, thus untilting the valve member 23. Upon continuing rotation of the cam, the cylindrical portion of the section 33 engages the end face 29 and serves to effect further unseating of the valve member (Figure 4a). The cylindrical portion when thus positioned serves to retain the valve member in unseated position to permit discharge of the contents of the container without manual engagement of the finger-piece 37.

From the foregoing, it will be apparent that my invention provides a valve organization capable of being operated by the application of a relatively small amount of force and which is simple in construction and highly efficient in operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A device of the class described, comprising a casing formed with inlet and outlet passages and a chamber communicating with said outlet passage; a valve seat arranged between said passages and provided with an opening for establishing communication between said passages; a valve member having a body disposed in said inlet passage and normally closing said opening in said seat, said body being provided with a stem extending through said outlet passage and terminating in said chamber, said stem being of substantially frustum-shaped configuration adjacent said body and coacting with the wall defining said opening to effect centralization of said stem in said outlet passage and thus permit said valve member to effectively close said opening; a spring mounted in said inlet passage and engaging said body to maintain said body in sealed relation with said seat; a cam rotatably mounted in said chamber and having a cam face normally adjacent said stem and disposed in spaced relation therewith, said cam being rotatable for effecting sliding engagement of said cam face with the end of said stem to tilt the latter away from the cam to effect decentralization of said stem in said outlet passage and thus pivot said body on said seat to disrupt said sealed relation; and manually operated means connected to said cam for rotating the latter to tilt said stem.

2. In a valve, a casing having a passage therein and a valve seat surrounding a portion of said passage, a valve member disposed in said passage adapted to normally engage said seat and having an elongated stem, and a rotatable cam having a face normally positioned with relation to said stem to permit said stem to assume a normal aligned position when said valve member engages said seat and constructed and arranged to engage said stem upon initial rotation of said cam to effect tilting of said stem and said valve member to partially unseat said valve member, said cam having a second face for engaging said stem upon further rotation of said cam constructed and arranged to move said stem into its normal aligned position and cause said valve member to be moved into a fully unseated position.

3. In a valve, a casing having a passage therein and a valve seat surrounding a portion of said passage, a valve member disposed in said passage adapted to normally engage said seat and having an elongated stem having an end face at the free end thereof, and a rotatable cam having a substantially diametrically extending face normally positioned with relation to said end face to permit said stem to assume a normal aligned position when said valve member engages said seat and constructed and arranged to engage said end face upon initial rotation of said cam to effect tilting of said stem and said valve member to partially unseat said valve member, said cam having an arcuate face for engaging said end face upon further rotation of said cam constructed and arranged to move said stem into its normal aligned position and cause said valve member to be moved into a fully unseated position.

4. In a valve, a casing having a passage therein and a valve seat surrounding a portion of said passage; a valve member disposed in said passage adapted to normally engage said seat and having an elongated stem; a rotatable cam having a face normally positioned with relation to said stem to permit said stem to assume a normal aligned position when said valve member engages said seat and constructed and arranged to engage said stem upon initial rotation of said cam to effect tilting of said stem and said valve member to partially unseat said valve member, said cam having a second face for engaging said stem upon further rotation of said cam constructed and arranged to move said stem into its normal aligned position and cause said valve member to be moved into a fully unseated position; and manually operable means at the exterior of said casing for effecting rotation of said cam.

5. In a valve, a casing having a passage therein and a valve seat surrounding a portion of said passage, a valve member disposed in said passage adapted to normally engage said seat and having an elongated stem, and a rotatable cam having a face normally positioned with relation to said stem to permit said stem to assume a normal aligned position when said valve member engages said seat and constructed and arranged to engage said stem upon initial rotation of said cam to effect tilting of said stem and said valve member to partially unseat said valve member, said cam having a second face for engaging said stem upon further rotation of said cam constructed and arranged to move said stem into its normal aligned position and cause said valve member to be moved into a fully unseated position, said stem having a portion constructed and arranged to engage the walls of said passage to assist movement of said stem into normal aligned position during movement of said cam to effect full unseating of said valve member.

6. In a valve, a casing having a passage therein provided with an inlet at one end and a cam chamber at the other end, a valve seat between said inlet and chamber, and an outlet between said chamber and seat; a valve member disposed in said passage adapted to normally engage said seat and having an elongated stem provided with a head at the free end thereof; and a rotatable cam in said chamber having a face normally positioned with relation to said head to permit said stem to assume a normal aligned position when said valve member engages said seat and constructed and arranged to engage said stem upon initial rotation of said cam to effect tilting of said stem and said valve member to partially unseat said valve member, said cam having a second face for engaging said stem upon further rotation of said cam constructed and arranged to move said stem into its normal aligned position and cause said valve member to be moved into a fully unseated position; said head being constructed and arranged to cooperate with a portion of said passage adjacent said cam chamber to assist movement of said stem into normal aligned position during movement of said cam to effect full unseating of said valve member.

JOHN H. STROOP.

REFERENCES CITED

The following references are of record in the file of this patent:

UNITED STATES PATENTS

| Number | Name | Date |
| --- | --- | --- |
| 421,182 | Meloney | Feb. 11, 1890 |
| 622,267 | Robinson | Apr. 4, 1890 |
| 649,641 | Kummer | May 15, 1900 |
| 662,503 | Schmidt | Nov. 27, 1900 |
| 1,523,981 | Harris | Jan. 20, 1925 |
| 1,853,463 | Schultheiss | Apr. 12, 1932 |
| 2,255,774 | Huffman | Sept. 16, 1941 |
| 2,365,371 | Yant | Dec. 19, 1944 |

FOREIGN PATENTS

| Number | Country | Date |
| --- | --- | --- |
| 562 | Great Britain | of 1878 |